US006153077A

United States Patent [19]

Kato et al.

[11] Patent Number: 6,153,077

[45] Date of Patent: Nov. 28, 2000

[54] PROCESS FOR PREPARING POROUS ELECTROLYTIC METAL FOIL

[75] Inventors: Hitoshi Kato, Utsunomiya; Koichi Ashizawa, Kusatsu; Tsukasa Akutsu, Imaichi, all of Japan

[73] Assignee: Circuit Foil Japan Co., Ltd., Tokyo, Japan

[21] Appl. No.: 09/065,092

[22] PCT Filed: Aug. 30, 1996

[86] PCT No.: PCT/JP96/02460

§ 371 Date: Apr. 28, 1998

§ 102(e) Date: Apr. 28, 1998

[87] PCT Pub. No.: WO98/09003

PCT Pub. Date: Mar. 5, 1998

[51] Int. Cl.[7] .......... C25D 1/04

[52] U.S. Cl. .......... 205/77

[58] Field of Search .......... 205/50, 77, 138, 205/171, 220, 191

[56] References Cited

U.S. PATENT DOCUMENTS 2,719,820 10/1955 Allen .......... 204/28
4,073,699 2/1978 Hutkin .......... 204/13
4,368,107 1/1983 Maejima et al. .......... 204/24
4,396,465 8/1983 Newell .......... 204/9
4,537,664 8/1985 Novacek .......... 204/28
4,684,447 8/1987 Murali et al. .......... 204/38.5
5,019,221 5/1991 Khalid et al. .......... 204/13
5,262,040 11/1993 Hardee et al. .......... 205/80
5,441,627 8/1995 Kato et al. .......... 205/77

FOREIGN PATENT DOCUMENTS 49-79931 8/1974 Japan .

*Primary Examiner*—Kathryn Gorgos
*Assistant Examiner*—Erica Smith-Hicks
*Attorney, Agent, or Firm*—Frishauf, Holtz, Goodman, Langer & Chick, P.C.

[57] ABSTRACT

A method of manufacturing a porous electrolytic metal foil, in which a thin metal layer is formed by electrically depositing a metal on the surface of a cathode body by moving the cathode body through an electrolyte. The thin metal layer is separated from the cathode body to form an exposed surface on the cathode body and a film of an electrical insulating material is formed on the exposed surface of the cathode body, by spraying a resin liquid onto the exposed surface, or by suspending machine oil or insulating oil in the electrolyte. The metal foil thus produced has many open-pores in the thickness direction. Therefore, when the metal foil is used as a collector for a battery electrode, there is an improvement in the cycle life characteristics of the battery.

13 Claims, 7 Drawing Sheets

F I G. 1
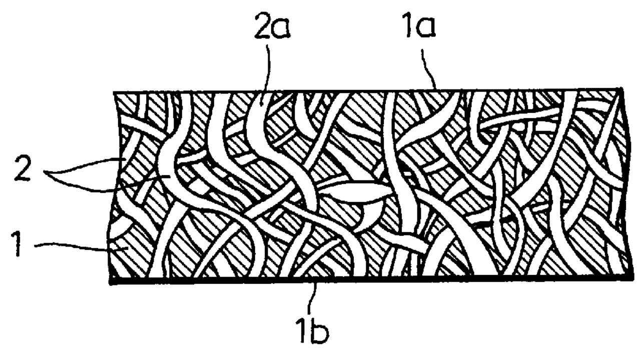
F I G. 2
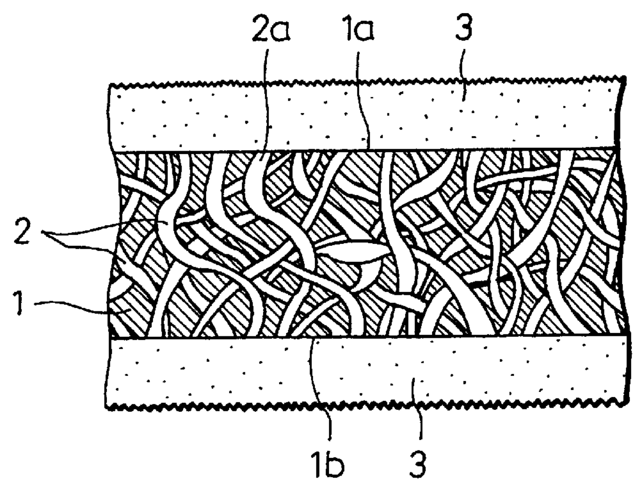
F I G. 3
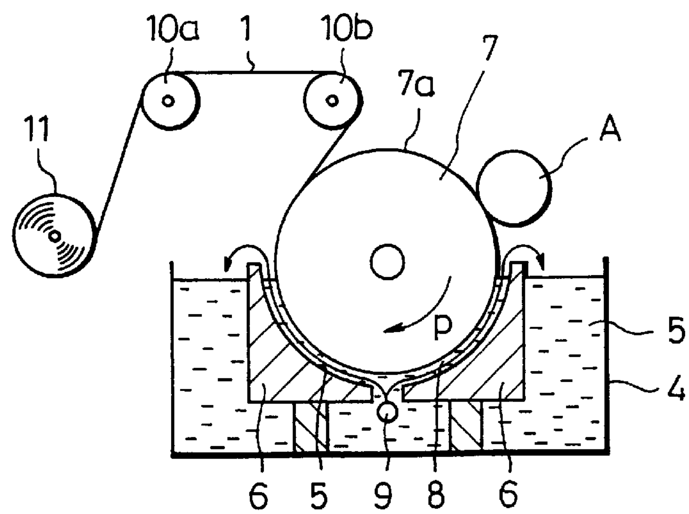

5
4
A
6
8
7'
P
9
7'a
5
10b
6
1
10a
11

F I G. 5
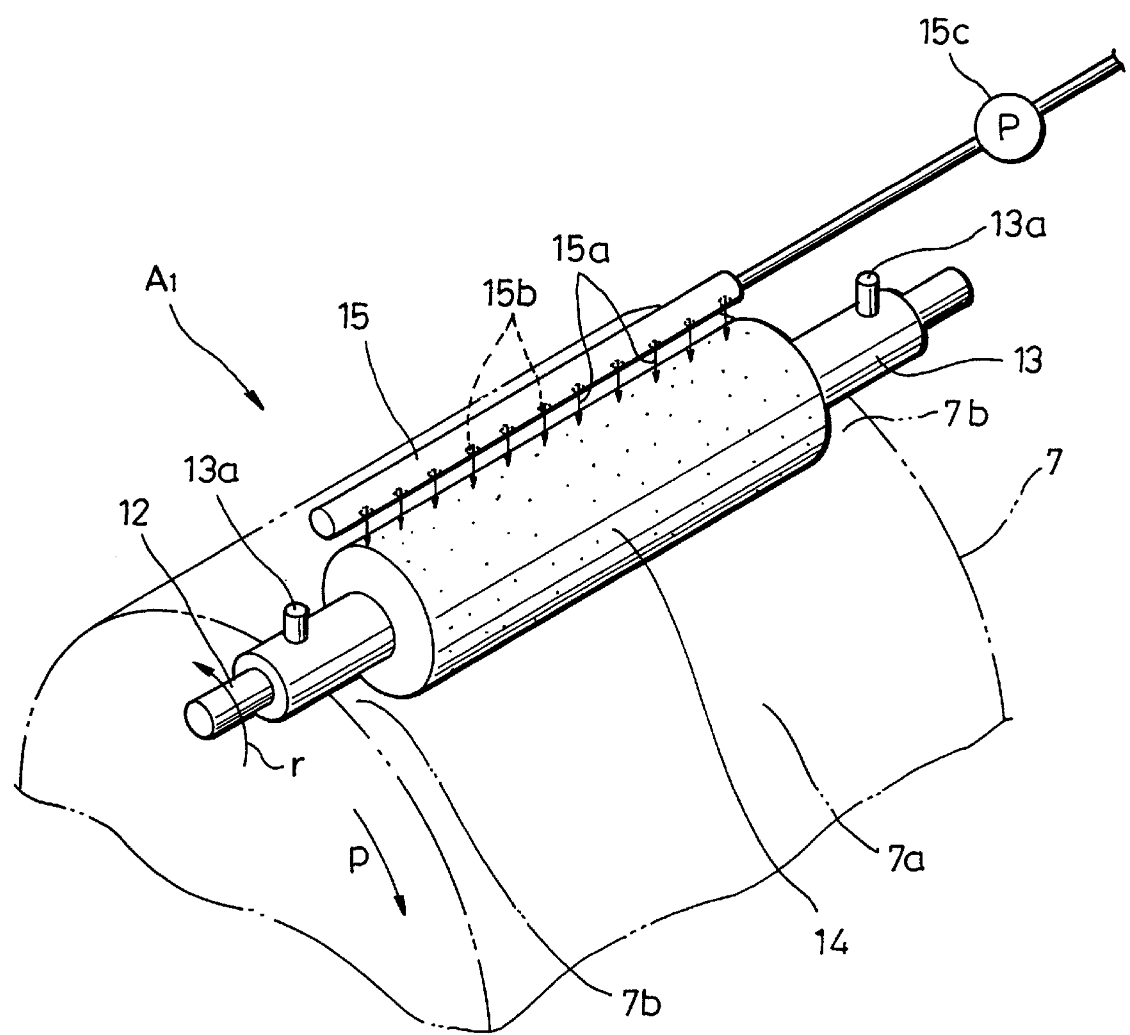

PROCESS FOR PREPARING POROUS ELECTROLYTIC METAL FOIL

TECHNICAL FIELD

The present invention relates to a method of manufacturing a porous electrolytic metal foil and, more particularly, to a method of manufacturing a porous electrolytic metal foil in which when the metal foil is used as a collector of secondary battery, a mixture for electrode can be supported firmly on the collector, and electron transfer reaction can be caused uniformly at the charging/discharging cycle time.

BACKGROUND ART

In recent years, as portable electronic equipment such as video cameras and notebook type computers has widely been used, the demand for small high-capacity secondary batteries has increased as power sources therefor. Most of the secondary batteries now being used are nickel-cadmium batteries containing an alkali electrolyte, the battery voltage thereof being about 1.2 V. For this reason, a nickel-hydrogen battery has received attention as a higher-power battery, and also a lithium battery has been developed.

The nickel-hydrogen battery works with hydrogen used as an active material for negative electrode. The negative electrode thereof is formed by supporting a hydrogen occlusion alloy capable of reversibly occluding/discharging hydrogen on the collector, and the positive electrode is formed by similarly supporting, for example, nickel hydroxide, which is an active material for positive electrode, on the collector.

For example, when a negative electrode of nickel-hydrogen battery is manufactured, predetermined amounts of hydrogen occlusion alloy powder, conductive material powder such as nickel, and binder powder such as polyvinylidene fluoride are mixed to yield a mixed powder, to which, for example, carboxymethyl cellulose solution is added, by which a slurry, which is a mixture for the negative electrode, is prepared. A collector such as a punching Ni sheet with a desirable opening ratio, a Ni foam sheet with a desirable porosity, or a Ni powder sintered body is filled with the slurry. The mixture is supported on the surface of the collector and in the inside voids thereof in a contacting state by sequentially performing drying, rolling, and heat treatment.

When a positive electrode is manufactured, predetermined amounts of nickel hydroxide powder, which is an active material for the positive electrode, and a conductive material such as nickel powder are mixed to yield a mixed powder, to which, a predetermined amount of, for example, carboxymethyl cellulose solution is added, and the whole mixture is agitated into a slurry form, by which a mixture for the positive electrode is prepared. Thereafter, a collector such as a Ni foam sheet is filled with the mixture for the positive electrode. The mixture for the positive electrode is supported on the collector by sequentially drying and rolling it.

Lithium batteries are broadly classified into metallic lithium batteries and lithium ion batteries.

For the metallic lithium battery, the negative electrode is formed of metallic lithium, and the positive electrode is formed by supporting an active material for positive electrode such as $LiCoO_2$ on a collector. For the lithium ion battery, the positive electrode is formed in the same manner as described above, but the negative electrode is formed by supporting, for example, carbon (C) capable of occluding/discharging lithium ions on a collector.

In the case of the former battery of the batteries of the two types, dendrite recrystallized lithium is deposited on the surface of metallic lithium, which is the negative electrode, during charging, and it grows as the charging/discharging cycle proceeds, so that the battery cycle life is decreased. In the worst case, the grown recrystallized lithium breaks a separator interposed between the positive and negative electrodes, sometimes causing a short circuit.

Thereupon, regarding the lithium battery, the research and development of a lithium ion battery incorporating a negative electrode formed by supporting carbon on the collector is now being carried on. This negative electrode does not present the problem with metallic lithium negative electrode during the charging/discharging cycle.

When a positive electrode of a lithium battery is manufactured, predetermined amounts of, for example, $LiCoO_2$ powder, which is an active material for the positive electrode, for example, C powder, which is a conductive material, and, for example, polyvinylidene fluoride, which is a binder, are first mixed to yield a mixed powder, to which a predetermined amount of nonaqueous solvent such as N-methylpyrrolidone is added. The whole mixture is mixed thoroughly, by which a pasted mixture, which is a mixture for the positive electrode, is prepared. Then, the mixture is applied onto the surface of collector consisting of metal foil or alloy foil such as Ni, Cu and Ti—Al foil made by, for example, rolling. Thereafter, the mixture for the positive electrode is dried to be put on the collector so as to be in firm contact and integral with the collector.

When a negative electrode of a lithium ion battery is manufactured, fiber-form, woven cloth-form, or felt-form carbon fiber itself is sometimes used as C. In general, however, predetermined amounts of C powder, the aforementioned binder powder, and nonaqueous solvent are mixed to prepare a pasted mixture for the negative electrode, and the mixture is applied to the collector consisting of a metal foil and pressed on it after being dried.

An important point for the aforementioned the positive and negative electrodes is that the mixture for positive or negative electrode (hereinafter called the electrode mixture) does not peel off from the collector when the electrode is incorporated into a battery or at the time of a charging/discharging cycle. If the mixture peels off from the collector, polarization begins to increase in the process of charging/discharging cycle, which causes the cycle life characteristics to decrease.

When a Ni foam sheet is used as a collector as in the case of the hydrogen-nickel battery, the electrode mixture is less prone to peel off because it fills the inside of the sheet.

However, the pore diameter of such a foam sheet, which is about 100 $\mu$m, is too large with respect to the whole sheet. Therefore, although this pore diameter is preferable from the viewpoint of increased filling amount of electrode mixture and useful to prevent the electrode mixture from peeling off, it decreases the mechanical strength of the sheet, so that the sheet is prone to be broken. Also, the filling of electrode mixture is nonuniform, so that the electron transfer reaction in the charging/discharging cycle is prone to be nonuniform.

When a punching metal sheet, in which openings of a predetermined diameter are formed regularly, for example, in a zigzag lattice pattern, is used as a collector, the opening diameter is too large with respect to the whole sheet as in the case of a foam sheet, and in manufacturing, an opening-less sheet must be punched, resulting in an increase in cost.

Sometimes, an expanded metal is used as a collector. To manufacture the expanded metal, a nonporous sheet must be subjected to special fabrication as in the case of the punching metal sheet, so that the cost of expanded metal is higher than that of the punching metal sheet.

In the case of the positive or negative electrode for a lithium battery, as described above, a metal foil usually manufactured by rolling is used as the collector, and paste such as an electrode mixture is simply applied to and pressed on the smooth surface thereof, so that peeling occurs easily.

For an electrode in which an electrode mixture is supported on both surfaces of the collector, it is very difficult to apply paste in the completely same thickness on both surfaces. The collector used is generally a rolled nonporous foil, so that lithium ions cannot migrate from one surface of the collector to the other surface thereof.

Therefore, during the charging/discharging, it is impossible to completely use the electrode mixture supported Ion both surfaces of the collector.

An object of the present invention is to provide a method of manufacturing a porous electrolytic metal foil, whereby in the process of making a metal foil by electrolytic plating, a porous metal foil structure can be formed simultaneously with the progress of foil making.

Another object of the present invention is to provide a method of manufacturing a porous electrolytic metal foil, in which a porous electrolytic metal foil, which is useful as a collector for a secondary battery electrode, is manufactured continuously and in large quantities, and therefore at a low cost.

SUMMARY OF THE INVENTION

To achieve the above objects, the present invention provides a method of manufacturing a porous electrolytic metal foil, comprising the steps of:

continuously forming a metal thin layer by electrically depositing metal ions on the surface of a moving cathode body by an electrolytic reaction which is carried out by immersing an anode body and the moving cathode body in an electrolyte containing metal ions and by applying electric current to between the anode body and moving cathode body while the moving cathode body is moved; and continuously manufacturing an electrolytic metal foil by continuously separating the metal thin layer from the surface of the moving cathode body while the moving cathode body is moved;

and further comprising the step of:

carrying out surface treatment of the exposed surface of the moving cathode body exposed after the metal thin layer is separated by wholly or partially forming a film consisting of an electrical insulating material on the exposed surface.

DETAILED DESCRIPTION OF THE INVENTION

FIG. 1 is a schematic sectional view showing a typical cross-sectional structure of a porous electrolytic metal foil manufactured by the method in accordance with the present invention, and FIG. 2 is a schematic sectional view showing a typical cross-sectional structure of an electrode formed by using the metal foil shown in FIG. 1 as a collector and by supporting an electrode mixture on both surfaces thereof.

In these figures, a metal foil 1 is formed with a plurality of open-pores penetrating in the thickness direction from one surface 1*a* thereof to the other surface 1*b*, and the metal foil has a porous structure as a whole.

The electrode shown in FIG. 2 has an electrode mixture 3 supported on the surfaces 1*a* and 1*b* of the aforesaid metal foil 1. The electrode mixture 3 is supported in such a manner as to get slightly into the open-pore 2 through an opening 2*a* of the open-pore 2, or in such a manner as to get considerably deep into the open-pore 2 when the open-pore 2 has a large diameter. Alternatively, the electrode mixture 3 is supported in such a manner that the electrode mixtures 3 filled in the open-pore 2 from both surfaces of the metal foil 1 come into contact with each other within the open-pore 2.

That is, these open-pores 2 offer an anchoring effect to the electrode mixture 3.

These open-pores 2 are formed randomly, so that not all pores are present as an open-pore penetrating the metal foil 1 from the surface 1*a* to the surface 1*b*, and some pores may be closed at an intermediate position.

For this metal foil 1, it is preferable that the thickness thereof be usually 8 to 100 $\mu$m in order to obtain a foil with a porous structure. If the metal foil 1 is too thin, it may be broken in the foil manufacturing process, described later. If it is too thick, the aforesaid open-pores are not formed.

It is preferable that the diameter of the opening 2*a* of the open-pore 2 be within the range of 0.1 to 80 $\mu$m, though changing depending on the thickness of the metal foil 1. Also, it is preferable that 1 to 500 pores be distributed per unit area (1 $mm^2$) on the surface of the metal foil 1.

If the diameter of the open-pore 2 is smaller than 0.1 $\mu$m, the electrode mixture 3 does not get into the pore smoothly even if the electrode mixture is applied to and pressed on the metal foil 1, so that the aforementioned anchoring effect is decreased, resulting in a decrease in contact strength between the electrode mixture 3 and the metal foil 1. If the diameter of the open-pore 2 is larger than 80 $\mu$m, the mechanical strength of the metal foil 1 decreases, so that the metal foil 1 is broken, for example, when the metal foil 1 is separated from the surface of the moving cathode body in the metal foil manufacturing process, described later.

If the distribution density of these pores on the surfaces 1*a* and 1*b* of the metal foil 1 is lower than 1 pore/$mm^2$, the contact strength between the electrode mixture 3 and the metal foil 1 decreases, so that the electrode mixture is liable to peel off.

If the distribution density is higher than 500 pores/$mm^2$, though the contact strength between the electrode mixture 3 and the metal foil 1 increases, the metal foil is too porous as a whole, resulting in a decrease in mechanical strength as described above.

In the electrode manufactured by using the metal foil of the present invention as a collector, the electrode mixture 3 supported on the surfaces 1*a* and 1*b* of the metal foil 1 is selected appropriately depending on the battery to be formed.

For example, when the intended electrode is the positive electrode for a nickel-hydrogen battery, the mixture for the positive electrode, in which nickel hydroxide powder is used as an active material, is supported on the surfaces of the metal foil. When it is the negative electrode, the mixture for the negative electrode, whose principal ingredient is hydrogen occlusion alloy powder, is supported.

When the intended electrode is the positive electrode for a lithium battery, the mixture for the positive electrode, whose principal ingredient is an active material such as lithium vanadium pentoxide, lithiummanganese oxide, and lithium cobalt oxide, is supported on the surfaces of the metal foil. When it is the negative electrode, the mixture for the negative electrode, whose principal ingredient is a powder consisting of C such as chips or powder of pyrolytic carbon, coke, graphite, vitreous carbon, resin baked body, activated charcoal, and carbon fiber, is supported.

The aforementioned metal foil is manufactured continuously as a porous electrolytic metal foil by operating the apparatus described below.

FIG. 3 is a schematic view showing a typical system used when the porous electrolytic metal foil in accordance with the present invention is manufactured. FIG. 4 is a schematic view showing another system.

In FIG. 3, an electrolytic bath 4 contains an electrolyte 5 containing metal ions which are the raw material for an electrolytic metal foil to be manufactured, an anode body 6 is disposed in this electrolyte 5, and a drum cathode body 7 facing the anode body 6 is disposed in such a manner that part of the drum cathode body 7 is immersed in the electrolyte 5.

The anode body 6 is usually made of lead. For the moving cathode body 7, 7', at least the surface thereof is made of stainless steel, Ti, Cr, Al, or Cr—Al alloy.

An electrolytic reaction is carried out by applying electric current to between the anode body 6 and the drum cathode body 7 while the drum cathode body 7 is rotated in the direction indicated by arrow p to move the surface thereof successively in the electrolyte 5 and while the electrolyte 5 is supplied continuously from a distributor 9 to a gap 8 between the anode body 6 and the drum cathode body 7.

In the system shown in FIG. 4, a belt cathode body 7' is used in place of the drum cathode body 7 shown in FIG. 3. This belt cathode body 7' is circulated in the direction indicated by arrow p, by which the surface thereof is moved successively in the electrolyte 5.

In the present invention, the aforementioned drum cathode body 7 and belt cathode body 7' are called a moving cathode body because the surface thereof on which an electrolytic metal foil is formed moves.

The metal ions are electrically deposited on the surface of the drum cathode body 7 or belt cathode body 7', where a metal thin layer is continuously formed so that the layer thickness increases successively in the moving direction of the surface of the drum cathode body 7 or belt cathode body 7'. This metal thin layer is separated from the surface of the drum cathode body 7 or belt cathode body 7' at a point where the surface emerges from the electrolyte, and wound around a take-up roll 11 as the electrolytic metal foil 1 via rolls 10*a* and 10*b*.

In the method of the present invention, an exposed surface 7*a*, 7'*a*, which is exposed on the drum cathode body 7 or belt cathode body 7' by the separation of the metal thin layer from the surface of the drum cathode body 7 or belt cathode body 7', is subjected to surface treatment, described later.

This surface treatment is carried out to form a film consisting of an electrical insulating material on the exposed surface 7*a*, 7'*a* of the moving cathode body 7, 7'.

Specifically, the surface treatment includes,

- a treatment for forming an oxide film with a thickness of at least 14 nm on the exposed surface 7*a*, 7'*a* by applying electrolytic oxidation to the exposed surface 7*a*, 7'*a* (called a first surface treatment);
- a treatment for adhering an organic substance on the exposed surface 7*a*, 7'*a* by spraying the organic substance onto the exposed surface 7*a*, 7' (called a second treatment); and
- a treatment for adhering an organic substance on the exposed surface 7*a*, 7'*a* by suspending the organic substance in the electrolyte (called a third treatment).

The following is a detailed description of these surface treatments.

First, the first surface treatment will be described. As shown in FIGS. 3 and 4, a oxide film forming apparatus A, described later, is mounted on the exposed surface 7*a*, 7'*a* of the moving cathode body 7, 7' from which the metal thin layer is separated. By operating this apparatus A, the exposed surface 7*a*, 7'*a* is electrolytically oxidized in the process before the exposed surface 7*a*, 7'*a* is immersed again in the electrolyte 5, so that an oxide film with a thickness of at least 14 nm is formed on the whole surface.

If the aforesaid metal thin layer is formed on the surface of the drum cathode body 7 or belt cathode body 7' with the oxide film formed on the surface, the metal thin layer is made to have a porous structure having open-pores. When the electrolytic metal foil is formed by separating the metal thin layer from the moving cathode body such as the drum cathode body 7 or belt cathode body 7', both of the surface (S surface) on the moving cathode body side and the opposite surface (M surface) become rough. Moreover,the opposite surface becomes rougher than the surface on the moving cathode body side.

At this time, if the formed oxide film is made thinner than 14 nm, the metal thin layer formed on the oxide film is difficult to have a proper porous structure having the aforesaid open-pores and the distribution density thereof. This decreases the performance of metal foil as a collector on which the electrode mixture as described above is supported with a high contact strength.

However, if the oxide film is made too thick, the metal thin layer formed on the oxide film becomes excessively porous, by which the mechanical strength thereof is decreased, so that a trouble such that the metal thin layer is broken when it is separated from the moving cathode body occurs frequently. Therefore, it is preferable that the thickness of the oxide film be not greater than 100 nm.

The apparatus A for forming the oxide film, which functions in the above-described manner, on the exposed surface of the moving cathode body includes holding means for holding an electrolytic treatment liquid for electrolytic oxidation so that the treatment liquid is in contact with the exposed surface of the moving cathode body; a counter electrode body disposed in the holding means so as to oppose to the exposed surface of the moving cathode body; and supply means for supplying the electrolytic treatment liquid to the holding means.

This apparatus A anodizes the exposed surface by applying electric current to between the moving cathode and the counter electrode body with the electrolytic treatment liquid supplied continuously from the supply means to the holding means and with the electrolytic treatment liquid in contact with the exposed surface of the moving cathode body while the metal thin layer is formed on the surface of the moving cathode body by applying electric current to between the anode body and the moving cathode body to continue electrolytic plating, without stopping the operation of the moving cathode body.

At this time, the operation is performed so that the operation potential is lower in the order of the anode body, moving cathode body, and counter electrode body. This is because if the operation potential does not establish the above relationship, the exposed surface of the moving cathode body is not electrolytically oxidized, so that the oxide film is not formed there.

The oxide film may be formed continuously or intermittently using the apparatus A.

When the metal thin layer formed by electric deposition is separated from the surface of the moving cathode body, part of the oxide film is removed to the metal thin layer side at the same time, so that the thickness of the oxide film is decreased gradually by the repetition of electric deposition and separation. Therefore, the metal thin layer formed on the oxide film does not have the proper porous structure as described above. To compensate the decreased thickness, the oxide film must be formed continuously or intermittently.

To operate the apparatus A, the constant current method or constant voltage method can be used. Of these two methods, the constant voltage method is preferable because the part of oxide film removed from the surface of the moving cathode body can be compensated automatically and instantly, and the thickness of the oxide film can be prevented from increasing up to the unnecessary thickness.

An example $A_1$ of the apparatus A will be described with reference to the drawing.

FIG. 5 is a partially cutaway perspective view showing a state in which an apparatus $A_1$ is mounted on the exposed surface 7*a* of the drum cathode body 7.

This apparatus $A_1$, having a shaft 12 for mounting the apparatus at the center, comprises a conductive roll 13 functioning as a counter electrode body opposing to the drum cathode body 7 in electrolytic oxidation, electrolytic treatment liquid holding means 14 disposed around the conductive roll 13, and a pipe which is electrolytic treatment liquid supply means 15 for supplying electrolytic treatment liquid 15*a* used for electrolytic oxidation to the electrolytic treatment liquid holding means 14. By rotatably supporting the shaft 12 by not-illustrated means with the electrolytic treatment liquid holding means 14 in contact with the exposed surface 7*a* of the drum cathode body 7 indicated by an imaginary line, the whole of the apparatus $A_1$ is mounted on the exposed surface 7*a* of the drum cathode body 7 as shown in FIG. 3.

The conductive roll 13 may be a roll the whole of which is made of a corrosion-resistant material such as titanium, nickel, chromium, copper, and stainless steel or a roll in which the surface of the above material is coated with a material having electric conductivity and resistance to corrosion caused by the electrolytic treatment liquid 15*a* used to form the oxide film, such as silver, silver alloy, gold, gold alloy, palladium, and palladium alloy. Also, the surface of a roll made of a non-conductive plastic material such as polypropylene or polyvinyl chloride may be covered with foil, wire, or mesh of a material having electric conductivity and corrosion resistance. Alternatively, a material having electric conductivity and corrosion resistance may be plated, thermally sprayed, or applied to the surface of the aforementioned roll. To sum up, a roll at least the surface of which has electric conductivity and corrosion resistance is used as a counter electrode body for electrolytic oxidation on the surface of the drum cathode body.

The electrolytic treatment liquid holding means 14 surrounding the conductive roll (counter electrode body) 13 has a proper elasticity as well as permeability. The electrolytic treatment liquid holding means 14 is formed by covering the outer periphery of the conductive roll 13 with a material having resistance to corrosion caused by the electrolytic treatment liquid used, such as felt, nonwoven fabric cloth, or split yarn of polyurethane, polyvinyl formal, or polyester.

Above the electrolytic treatment liquid holding means 14, the pipe 15 formed with a plurality of openings 15*b* in the axial direction of the electrolytic treatment liquid holding means 14 is disposed as electrolytic treatment liquid supply means, and the predetermined electrolytic treatment liquid 15*a* is supplied to the pipe 15 by means of a pump 15*c*. The supplied electrolytic treatment liquid 15*a* is not subject to any special restriction, and a liquid which does not have an adverse effect on the manufacture of metal thin layer even if being mixed with the electrolyte used for the manufacture of metal thin layer is used. For example, a liquid which is the same as the electrolyte used at present to make metal electrically deposit on the surface of the drum cathode body, or a liquid which has the same components as those of the electrolyte but a different ratio of components can be used.

As the electrolyte, for example, copper sulfate solution is used in manufacturing electrolytic copper foil, and nickel sulfate solution or nickel sulfamate solution is used in manufacturing electrolytic nickel foil. Also, in manufacturing electrolytic aluminum foil, $AlCl_3$—$LiAlH_4$-tetrahydrofuran bath and NaF.2Al$(C_2H_5O)_3$.4toluene bath, which are disclosed in Japanese Patent Publication No. 48-4460, and the like can be used.

As the electrolytic treatment liquid 15*a*, a liquid which does not contain ions of metal deposited on the drum cathode body 7 can also be used. Such electrolytic treatment solutions include an acidic solution such as sulfuric acid solution, phosphoric acid solution, and hydrochloric acid solution and a neutral solution in which sodium sulfate, potassium sulfate, sodium hydrochloride, potassium hydrochloride, etc. are dissolved. Among these, sulfuric acid solution is preferably used in manufacturing electrolytic copper foil by using copper sulfate electrolyte.

The supply means for the electrolytic treatment liquid 15*a* is not limited to the above-mentioned pipe-form means. For example, the conductive roll 13 is made hollow, many openings Bare formed on the peripheral surface thereof, and the electrolytic treatment liquid 15*a* is supplied to the hollow portion of the conductive roll 13, by which the electrolytic treatment liquid 15*a* may be supplied to the electrolytic treatment liquid holding means 14 from the inside thereof through the openings on the peripheral surface of the conductive roll 13.

When the apparatus $A_1$ is used, the oxide film is formed on the exposed surface 7*a* of the drum cathode body 7 in the following manner.

First, the electrolytic treatment liquid holding means 14 of the apparatus $A_1$ is elastically brought into contact with the exposed surface 7*a* of the drum cathode body 7 rotating in the direction indicated by arrow p. Thereupon, the electrolytic treatment liquid holding means 14 rotates automatically in the direction indicated by arrow r in FIG. 5. With this state being kept, a predetermined electrolytic treatment liquid 15*a* is supplied to the pipe (electrolytic treatment liquid supply means) 15.

The electrolytic treatment liquid 15*a* drips onto the electrolytic treatment liquid holding means 14 from the openings 15*b*, permeates into the electrolytic treatment liquid holding means 14, and is kept therein. As a result, the conductive roll (counter electrode body for electrolytic oxidation) 13 and the exposed surface 7*a* of the drum cathode body 7 becomes conductive via the electrolytic treatment liquid 15*a*.

Then, terminals 13*a*, 13*a* attached to the conductive roll 13 are connected to the minus side of a power supply (not shown), and the exposed surface 7*a* of the drum cathode body 7 is connected to the plus side of the power supply so that an electrolytic current flows between the conductive roll 13 and the exposed surface 7*a* of the drum cathode body 7, whereby the exposed surface is anodized. At this time, the conductive roll (counter electrode body) 13 is operated so that the potential becomes to be lower than the potential of the drum cathode body in the electrolytic bath on which surface is formed a metal thin layer, and at the same time, the potential of the anode body positioned in the electrolytic bath is made higher than that of the drum cathode body. If the potential of the drum cathode body is higher than that of the anode body, there occurs a problem such that metal is not electrically deposited on the surface of the drum cathode body, or a problem such that if electric current is applied so that the potential of the conductive roll is higher than that of the drum cathode body, the conductive roll 13 is made the plus electrode, and the exposed surface 7*a* of the drum cathode body 7 is made the minus electrode, so that the exposed surface 7*a* of the drum cathode body 7 is not electrolytically oxidized.

By properly selecting the rotational speed of the drum cathode body 7, the operation potential of the conductive roll (counter electrode body), and the like, an oxide film with a desirable thickness is formed on the exposed surface 7*a.*

In this apparatus $A_1$, it is preferable that the width of the electrolytic treatment liquid holding means 14 is smaller than that of the drum cathode body 7 so that both side portions 7*b*, 7*b* on the exposed surface 7*a* of the drum cathode body 7 are not electrolytically oxidized.

The reason for this is as follows: The metal thin layer directly formed at these portions 7*b*, 7*b* has a higher mechanical strength than the porous metal thin layer formed on the oxide film produced by the apparatus $A_1$. Therefore, when the metal thin layer is separated from the drum cathode body, a trouble of breaking of the metal thin layer in the process of separation can be prevented by starting the separation from the portion of metal thin layer formed at the portions 7*b*, 7*b*.

FIG. 6 is a partially cutaway perspective view showing a state in which another apparatus $A_2$ is mounted on the exposed surface 7*a* of the drum cathode body 7.

In the case of this apparatus $A_2$, the electrolytic treatment liquid holding means 16 is a box-shaped vessel whose one face is open, and this opening 16*a* is disposed in liquid-tight slidable contact with or close to the exposed surface 7*a* of the drum cathode body 7. Therefore, the portions of sides 16*b*, 16*b* of the vessel 16, which are in slidable contact with or close to the exposed surface 7*a* of the drum cathode body 7, are curved so as to match the curvature of the exposed surface 7*a* of the drum cathode body 7.

The width of the vessel 16 is smaller than that of the drum cathode body 7 for the same reason as that in the case of the electrolytic treatment liquid holding means 14 for the apparatus $A_1$, so that both side portions 7*b*, 7*b* of the exposed surface 7*a* of the drum cathode body 7 are not electrolytically oxidized.

It is preferable that the vessel 16 be made of a material which is resistant to corrosion caused by the electrolytic treatment liquid used, such as polyvinyl chloride and polypropylene.

In the case where the vessel 16 is disposed so as to be in slidable contact with the exposed surface 7*a* of the drum cathode body 7, it is preferable that the vessel 16 be made of a material having wear-resistance, lubricity, and elasticity, such as polyethylene, polyester, polyurethane, and silicone rubber. In this vessel 16, a counter electrode body 17 for electrolytic oxidation, which is made of, for example, titanium or stainless steel, is disposed. This counter electrode body 17 faces the exposed surface 7*a* of the drum cathode body 7 exposed to the interior of the vessel 16 through the opening 16*a* of the vessel 16.

A supply pipe 18*a* for electrolytic treatment liquid is attached to the side wall of the vessel 16, and a discharge pipe 18*b* for electrolytic treatment liquid is attached to the top wall thereof, these pipes constituting electrolytic treatment liquid supply mean 18. The electrolytic treatment liquid used to form an oxide film is supplied into the vessel 16 through the supply pipe 18*a* to fill the vessel 16, covers the exposed surface 7*a* of the drum cathode body 7, and flows out of the system through the discharge pipe 18*b*.

Electric current is applied to between the counter electrode body 17 and the drum cathode body 7 while allowing the electrolytic treatment liquid to flow in the vessel 16, by which the exposed surface 7*a* of the drum cathode body which is exposed to the interior of the vessel 16 through the opening 16*a* can be electrolytically oxidized.

If the vessel 16 is mounted so that some clearance is formed between the opening 16*a* of the vessel 16 and the exposed surface 7*a* of the drum cathode body 7, part of the supplied electrolytic treatment liquid flows out along the exposed surface 7*a* of the drum cathode body 7 through the clearance, so that an electrolytic treatment liquid film with a uniform thickness is formed on the exposed surface 7*a* of the drum cathode body which is exposed to the interior of the vessel 16 through the opening 16*a*, by which the forming condition of oxide film is preferably stabilized.

For the electrolytic treatment liquid supplied into the vessel 16, the electrolyte used for manufacturing a metal thin layer is usually used as it is by being pumped up.

FIG. 7 and FIG. 8, which is a sectional view taken along the line VIII—VIII of FIG. 7, are views showing a state in which another apparatus $A_3$ is mounted on the exposed surface of the drum cathode body.

This apparatus $A_3$ has electrolytic treatment liquid holding means consisting of a trough-shaped vessel 19. For this trough-shaped vessel 19, the upper part is open, and both of the ends 19*a*, 19*a* in the lengthwise direction are sealed. One end 19*a* is provided with a supply pipe 20 for electrolytic treatment liquid, constituting electrolytic treatment liquid supply means. One side 19*b* of the trough-shaped vessel 19 is lower in height than the other side 19*c*.

The length of the trough-shaped vessel 19 is shorter than the width of the drum cathode body 7 for the same reason as that in the case of the electrolytic treatment holding means 15 of the apparatus $A_1$ so that both side portions 7*b*, 7*b* of the exposed surface 7*a* of the drum cathode body 7 are not electrolytically oxidized.

The trough-shaped vessel 19 is mounted so that the lengthwise direction thereof agrees with the width direction of the drum cathode body 7, and the one side 19*b* is close to the exposed surface 7*a* of the drum cathode body so as to form some clearance between the side 19*b* and the exposed surface 7*a* of the drum cathode body.

A counter electrode body 17 is disposed on the other side 19*c* of the trough-shaped vessel 19, and a metal powder removing filter 21 is interposed between the counter electrode body 17 and the exposed surface 7*a* of the drum cathode body. As a result, the interior of the trough-shaped vessel 19 is divided into a space 19*d* where the counter electrode body 17 is disposed and a space 19*e* positioned on the side of the exposed surface 7*a* of the drum cathode body.

The metal powder removing filter 21 prevents metal powder from depositing on the exposed surface 7*a* of the drum cathode body 7, the metal powder being deposited on the exposed surface 7*a* of the drum cathode body 7 by a process in which the metal contained in the electrolytic treatment liquid is electrically deposited abnormally as metal powder on the surface of the counter electrode body 17 in the electrolytic treatment, and the metal powder is removed from the counter electrode body by the flow of electrolytic treatment liquid.

The electrolytic treatment liquid supplied to the trough-shaped vessel 19 through the supply pipe 20 overflows over the side 19*b* after filling the trough-shaped vessel 19, and flows down along the exposed surface 7*a* of the drum cathode body rotating in the direction indicated by arrow p. In this process, therefore, an electrolytic treatment liquid film with a uniform thickness is continuously formed on the exposed surface 7*a* of the drum cathode body.

For the electrolytic treatment liquid, the electrolyte used for manufacturing a metal thin layer may be used as it is. Alternatively, electrolytic treatment liquid supply pipes connecting with the spaces 19*d* and 19*e* formed in the trough-shaped vessel 19 may be disposed separately so that, for example, the electrolyte used for manufacturing a metal thin layer is supplied to the space 19*d* and an electrolyte with a different composition or containing no metal ions is supplied to the spade 19*e*.

The cross-sectional shape of the trough-shaped vessel 19 is not limited to a triangular one as shown in FIGS. 7 and 8. The shape may be a polygon such as quadrangle and hexagon or a semicircle. In effect, the trough-shaped vessel 19 may be shaped so that the electrolytic treatment liquid filling the vessel 19 overflows over the side 19*b* so that a liquid film can be formed on the exposed surface 7*a* of the drum cathode body.

FIG. 9 and FIG. 10, which is a sectional view taken along the line X—X of FIG. 9, are views showing a state in which still another apparatus $A_4$ is mounted on the exposed surface of the drum cathode body.

This apparatus $A_4$ has electrolytic treatment liquid holding means 22 consisting of an elongated closed vessel of a convex lens shape in cross section.

Specifically, an attaching portion 22*b* of a counter electrode body 17 for electrolytic oxidation is mounted at the 114 back of a curved plate 22*a* in a liquid tight manner, both ends 22C, 22C in the lengthwise direction are sealed, a supply pipe 23 for electrolytic treatment liquid is attached to a substantially central position of vessel, and electrolytic treatment liquid spraying means 22*d* is formed at the tip end of the curved plate 22*a*, by which the electrolytic treatment liquid supply means for supplying electrolytic treatment liquid onto the exposed surface 7*a* of the drum cathode body 7 is formed. The spraying means 22*d* may consist of, for example, a plurality of holes formed along the lengthwise direction of the curved plate 22*a* or a slit with a predetermined width formed in the lengthwise direction of the curved plate 22*a*.

The length of the closed vessel 22 is shorter than the width of the drum cathode body 7 for the same reason as that in the case of the electrolytic treatment holding means 15 of the apparatus $A_1$ so that both side portions 7*b*, 7*b* of the exposed surface 7*a* of the drum cathode body 7 are not electrolytically oxidized.

The whole vessel is so configured that the counter electrode body 17 is disposed at the attaching portion 22*b*, the lengthwise direction of the vessel agrees with the width direction of the drum cathode body 7, and spraying means 22*d* formed in the curved plate 22*a* is disposed so as to face the exposed surface 7*a* of the drum cathode body 7 with a predetermined gap.

The electrolytic treatment liquid fed into the vessel 22 through the supply pipe 23 by pumping etc. is sprayed from the spraying means 22*d* after filling the vessel 22 to hit the exposed surface 7*a* of the drum cathode body 7 rotating in the direction indicated by arrow p, and flows down along the exposed surface 7*a*, whereby a liquid film with a uniform thickness is formed.

As the electrolytic treatment liquid, the electrolyte used for manufacturing a metal thin layer may be used, and if necessary, another electrolyte such as dilute sulfuric acid solution may be used.

While this state is maintained, a predetermined voltage is applied to between an anode of the drum cathode body 7 and a cathode of the counter electrode body 17, by which the exposed surface 7*a* of the drum cathode body is electrolytically oxidized. Since the drum cathode body 7 is rotated in the direction indicated by arrow p in the figures, an oxide film is formed continuously or intermittently on the exposed surface 7*a*.

Although in this apparatus $A_4$, the surface opposing to the exposed surface 7*a* of the drum cathode body is curved, the shape is not limited to this one, and any shape such that the electrolytic treatment liquid filling the vessel interior can be sprayed toward the exposed surface 7*a* of the drum cathode body may be used. Also, means for uniformly distributing the electrolytic treatment liquid, for example, means in which uniform small holes are formed in a pipe and the electrolytic treatment liquid supplied to this pipe is sprayed from these small holes may be provided within the vessel 22. Further, the supply pipe 23 is not necessarily attached to the central position of the apparatus $A_4$, but may be attached to any position where the electrolytic treatment liquid can be sprayed uniformly from the spraying means 22*d*.

Also, a metal powder removing filter may be provided between the counter electrode body 17 and the spraying means 22*d* as in the case of the apparatus $A_3$ so as to prevent the metal powder electrically deposited on the counter electrode body from flowing out onto the exposed surface 7*a* of the drum cathode body 7.

This apparatus $A_4$ achieves an effect that when the electrolyte for manufacturing a metal thin layer, which has a relatively high metal concentration, is used as the electrolytic treatment liquid, the amount of electrolyte used can be decreased by making the spray opening of the spraying means 22*d* smallest possible, and the deposition of metal salt in the electrolytic treatment liquid used can be inhibited to the utmost by decreasing the amount of scattered electrolyte.

For example, when an electrolytic copper foil is manufactured by using copper sulfate electrolyte, copper sulfate solution having a relatively high copper concentration is used as an electrolyte. When this electrolyte is used as an electrolytic treatment liquid for forming an oxide film, copper sulfate crystals are produced if the temperature is low, and stick to the apparatus and the electrolytic copper foil, thereby inhibiting the smooth operation of the apparatus. In the apparatus $A_4$ shown in FIGS. 9 and 10, this trouble can be eliminated easily by merely changing the shape of the spraying means 22*d* and the distance from the spraying means 22*d* to the exposed surface 7*a* of the drum cathode body.

Next, a second surface treatment will be described.

In this treatment, by spraying an organic substance onto the exposed surface of moving cathode body, the exposed surface is partially covered with a film formed by the organic substance adhering on the exposed surface in a speck form.

Specifically, a resin liquid of any kind is sprayed onto the exposed surface of moving cathode body, and then the resin is cured. The sprayed resin liquid turns into minute liquid drops and sticks onto the exposed surface of moving cathode body in a speck form, and is cured on the exposed surface. As a result, a film consisting of hardened particles of the liquid drops is formed on the exposed surface of moving cathode body.

The film formed at this time is not a dense resin film of the resin constituting the resin liquid used, but is formed by the hardened particles of the resin adhering discontinuously onto the exposed surface of moving cathode body.

Therefore, when electric current is applied to between the moving cathode body and the anode body to carry out electrolytic reaction, electric deposition is inhibited at the portions of the hardened particles, so that the metal thin layer formed on this film becomes porous.

The organic substance used for forming this film is not subject to any special restriction, and may be any organic substance which is electrically insulating and capable of being sprayed. A resin liquid in which a resin such as polyester, epoxy resin, polyamide, and polyurethane is dissolved in an appropriate solvent can be used.

Also, by appropriately selecting the spraying conditions such as spraying pressure, diameter of nozzle used for spraying, and discharge amount of resin liquid, the size and distribution density of the hardened particles are changed, whereby the porosity of this film, and in turn, the porosity of metal thin layer formed on the film can be regulated.

In a third surface treatment, an organic substance is suspended in the electrolyte.

In the apparatuses shown in FIGS. 3 and 4, the anode body 6 is usually formed of a material insoluble in electrolyte, such as lead, so that a large quantity of oxygen gas is generated from the surface of the anode body 6 when electric current is applied, and heavily agitates the electrolyte flowing between the anode body 6 and the moving cathode body 7, 7'. Therefore, if an organic substance is added to the electrolyte in the course of electrolytic plating, the organic substance is dispersed and suspended in a particulate form in the electrolyte being agitated.

The organic substance used in this treatment may be any organic substance which is electrically insulating, insoluble in electrolyte, and suspended in a particulate state in electrolyte. For example, various machine oils or insulating oils are used.

In this treatment, when the moving cathode body is moved and immersed in the electrolyte, the aforesaid organic it substance, which is dispersed and suspended in a particulate state in the electrolyte, adheres to the exposed surface. As a result, particulates of organic substance are formed in a row on the exposed surface of moving cathode body, so that a microscopically porous film is formed.

Since electric current is applied to between the moving cathode body and the anode body in this process, the metal thin layer formed on this film also becomes porous for the same reason as described regarding the second surface treatment.

At this time, by appropriately selecting the kind of the suspended organic substance, suspension concentration, and the like, the porosity of film, and in turn, the porosity of metal thin layer formed on the film can be regulated.

On the surface of metal foil thus manufactured, a preservative film may be formed, if necessary, for actual use by using an organic preservative such as benzotriazole or an inorganic preservative such as chromate treatment liquid.

Also, if, for example, a silane coupling agent is applied onto the surface of manufactured metal foil, the contact strength between the electrode mixture and the metal foil can be enhanced when the electrode mixture is supported on the surface of metal foil.

BRIEF DESCRIPTION OF THE DRAWINGS

FIG. 1 is a sectional view showing a typical cross-sectional structure of a metal foil manufactured by a method in accordance with the present invention;

FIG. 2 is a sectional view of a typical electrode with a collector using a metal foil manufactured by a method in accordance with the present invention;

FIG. 3 is a schematic view showing a manufacturing system for an electrolytic metal foil;

FIG. 5 is a partially cutaway perspective view showing a state in which an apparatus $A_1$ used for forming an oxide film is mounted on the exposed surface of a drum cathode body;

BEST MODE OF CARRYING OUT THE INVENTION

WORKING EXAMPLES 1 AND 2, COMPARATIVE EXAMPLES 1 AND 2

1) Manufacture of metal foil

Figure 9:
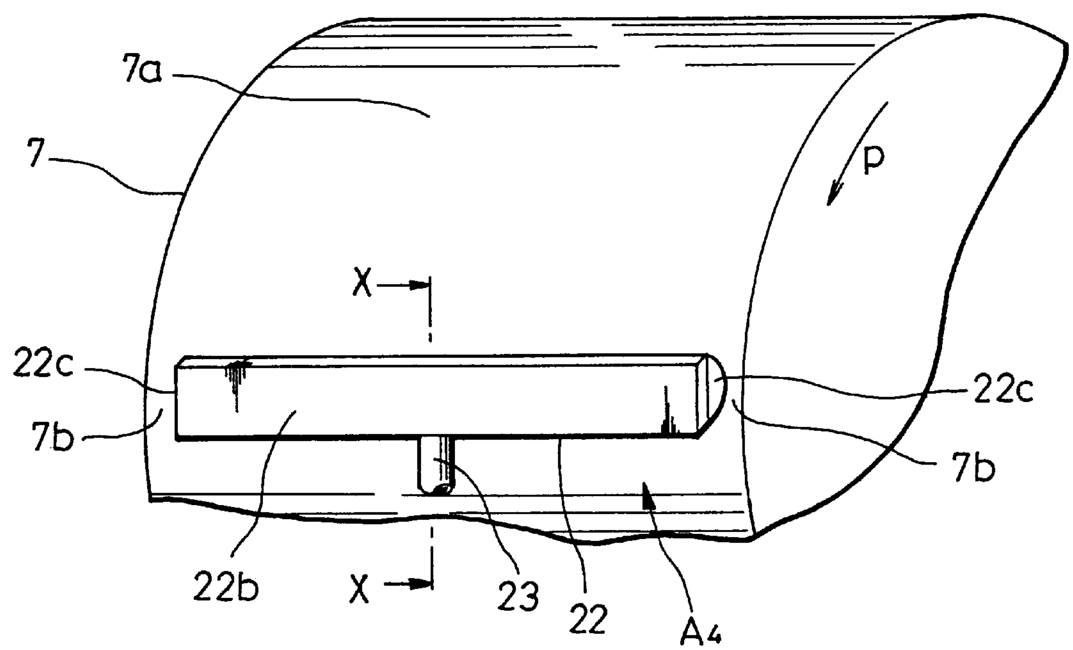
FIG. 9 is a partially cutaway perspective view showing a state in which an apparatus $A_4$ used for forming an oxide film is mounted on the exposed surface of a drum cathode body.
Figure 10:
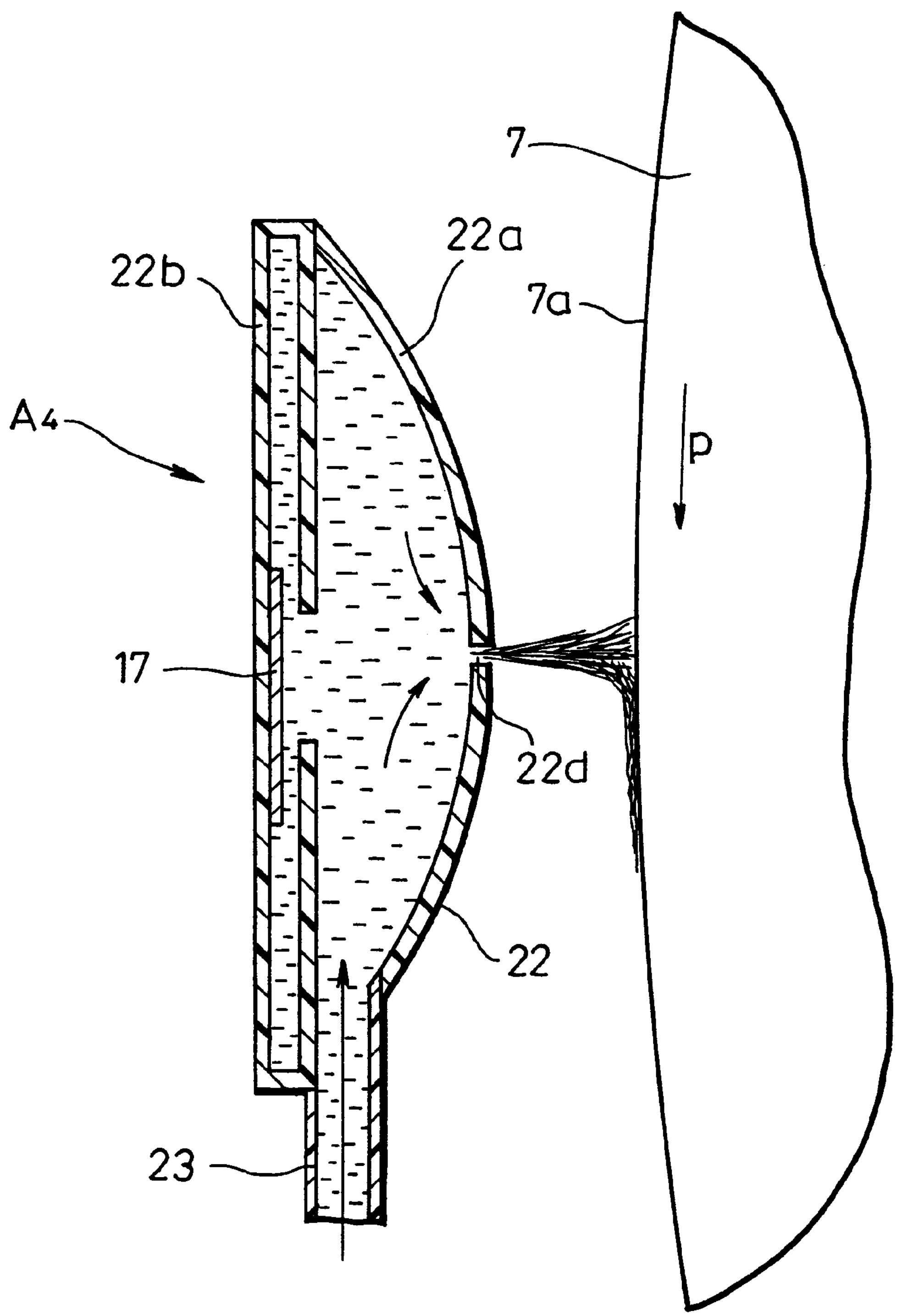
FIG. 10 is a sectional view taken along the line X—X of FIG. 9.

In the system shown in FIG. 3, the drum cathode body 7 was made of titanium, and the apparatus $A_4$ shown in FIGS. 9 and 10 was mounted on the surface of the drum cathode body 7.

The electrolyte 5 with a copper ion concentration of 100 g/liter, a sulfuric acid concentration of 100 g/liter, and a bath temperature of 60° C. was supplied into the electrolytic bath 4. While the drum cathode body 7 was rotated, an electric current with a current density of 60 A/dm$^2$ was applied to between the drum cathode body 7 and the anode body 6 to continuously form a copper thin layer on the surface of the drum cathode body 7. By separating the copper thin layer from the surface of the drum cathode body 7, the electrolytic copper foil 1 was manufactured continuously.

While the manufacture of the electrolytic copper foil 1 was continued, the aforesaid electrolyte was supplied into the closed vessel 22 through the supply pipe 23 of the apparatus $A_4$, and sprayed onto the exposed surface **7*a* of the drum cathode body 7 rotating in the direction indicated by arrow p from the spraying means 22*d* while the voltage between the drum cathode body 7 and the counter electrode body (made of titanium) 17** was kept at a constant value of 50 V.

A titanium oxide film with a thickness of 70 nm was formed continuously on the exposed surface **7*a* of the drum cathode body 7**.

Copper was electrically deposited on this titanium oxide film to form a copper thin layer. By continuously separating the copper thin layer from the drum cathode body 7, the electrolytic copper foil 1 was obtained.

Then, the obtained electrolytic copper foil 1 was subjected to surface roughening with a current density of 30 A/dm$^2$ by using an electrolyte with a copper ion concentration of 20 g/liter, a sulfuric acid concentration of 40 g/liter, and a bath temperature of 30° C.

For the electrolytic copper foil after surface roughening, the average thickness was 50 μm, and the surface roughnesses (Rz) of the separation surface (S surface) from the drum cathode body and the opposite surface (M surface) were 5 μm and 11 μm, respectively.

Also, in this electrolytic copper foil, open-pores communicating in the thickness direction were found. The diameter of the open-pore was 0.1 to 3 μm, and the distribution density thereof was 100 to 200 pores/mm$^2$.

2) Manufacture of electrode

Ten parts by weight of polyvinylidene fluoride powder was mixed with 100 parts by weight of KETJEN BLACK EC(carbon black manufactured by KETJEN BLACK INTERNATIONAL CO., LTD. and sold by LION AKZO CO., LTD., specific surface area: 950 m$^2$/g, average grain size: 0.03 μm), and 30 parts by weight of N-methylpyrrolidone was added to the resultant mixed powder to prepare paste of active material mixture.

This paste was applied to both of the surfaces of the aforesaid electrolytic copper foil, dried, and press-formed at a pressure of 2000 kg/cm$^2$ to manufacture a working example electrode 1 of 100 μm thick, 10 mm wide, and 20 mm long. The amount of active material mixture supported on this electrode was 20 mg.

A working example electrode 2 was manufactured in the same way as in the case of the working example electrode 1 except that the electrolytic copper foil was manufactured while forming a titanium oxide film of 14 nm thick on the exposed surface 7*a* of the drum cathode body 7 by applying a constant voltage of 10 V to between the counter electrode body 17 and the drum cathode body 7 when the oxide film was formed.

For the electrolytic copper foil used for this working example electrode 2, the average thickness was 50 μm, the Rz of S surface was 2 μm, the Rz of M surface was 10 μm, the diameter of open-pore was 0.1 to 3 μm, and the distribution density thereof was 20 to 40 pores/mm$^2$.

For comparison, a rolled copper foil of 50 μm thick was prepared, and 20 mg of an active material mixture was put on both of the surfaces thereof in the same way as described above to manufacture a comparative example electrode 1.

Also, both of the surfaces of the aforesaid rolled copper foil were roughened to about Rz 2 to 5 μm with #800 emery paper, i;, and 20 mg of an active material mixture was put thereon in the same way as in the working examples to manufacture a comparative example electrode 2.

3) Cycle life of electrode

An electrolyte formed by dissolving lithium perchlorate of 1 M in propylene carbonate of 1 kg was prepared. Each of the aforesaid electrodes was disposed in this electrolyte as a negative electrode, and metallic lithium foils were disposed as a counter electrode and a reference electrode, by which four kinds of three-electrode cells were assembled.

Then a charging/discharging cycle test was made. In one cycle of this test, a constant current of 1.2 mA was applied to the aforesaid three-electrode cell to perform charging until the voltage reached 0 V with respect to the potential of the reference electrode, the current application was halted for 20 minutes, and then discharging was performed with a constant current of 1.2 mA until the voltage reached 1.5 V with respect to the potential of the reference electrode.

For each three-electrode cell, the discharge capacity at the 20th cycle in the charging/discharging cycle test was compared with the discharge capacity at the 1st cycle, and the ratio (%) of the former to the latter was calculated. The result is given in Table 1.

TABLE 1

| | Ratio of discharge capacity in charging/discharging cycle test (%: 20th cycle/1st cycle) |
|---|---|
| Working example electrode 1 | 97 or higher |
| Working example electrode 2 | About 80 |
| Comparative example electrode 1 | About 40 |
| Comparative example electrode 2 | About 70 |

As is apparent from the above result, the discharge capacity of the working example electrode is less prone to decrease in the process of charging/discharging cycle, so that the working example electrodes have excellent cycle life characteristics.

The reason for this is that because the collector (electrolytic copper foil) has a porous structure of the aforesaid specification, the contact strength between the collector and the active material mixture supported on the collector is high, so that the active material mixture is effectively prevented from peeling off in the process of the charging/discharging cycle test. Also, the reason for this is thought to be that because the electrolytic copper foil is porous and open-pores penetrate the foil in the thickness direction, lithium ions pass through the open-pores between the active material mixtures supported on the surfaces, so that a uniform electron transfer reaction proceeds.

WORKING EXAMPLE 3

Figure 4:
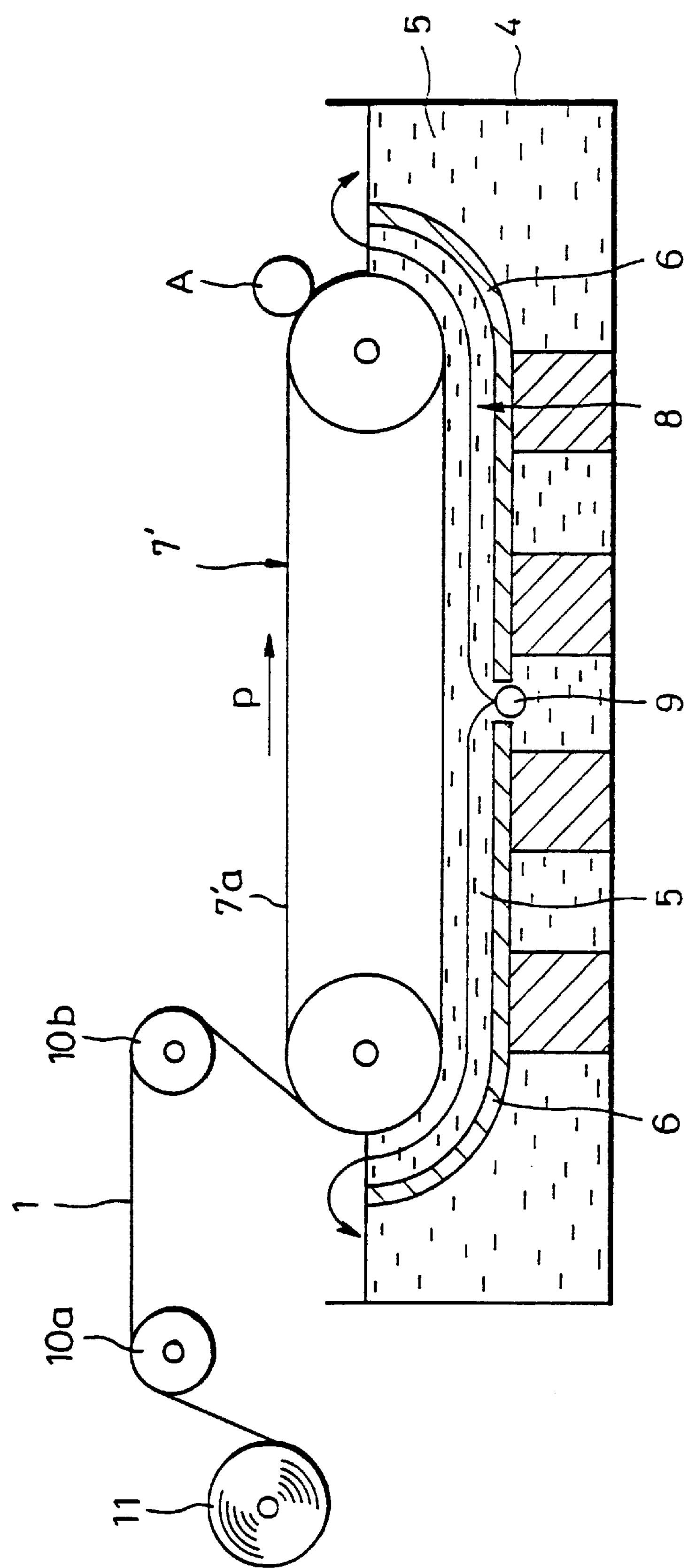
FIG. 4 is a schematic view showing another manufacturing system.
Figure 6:
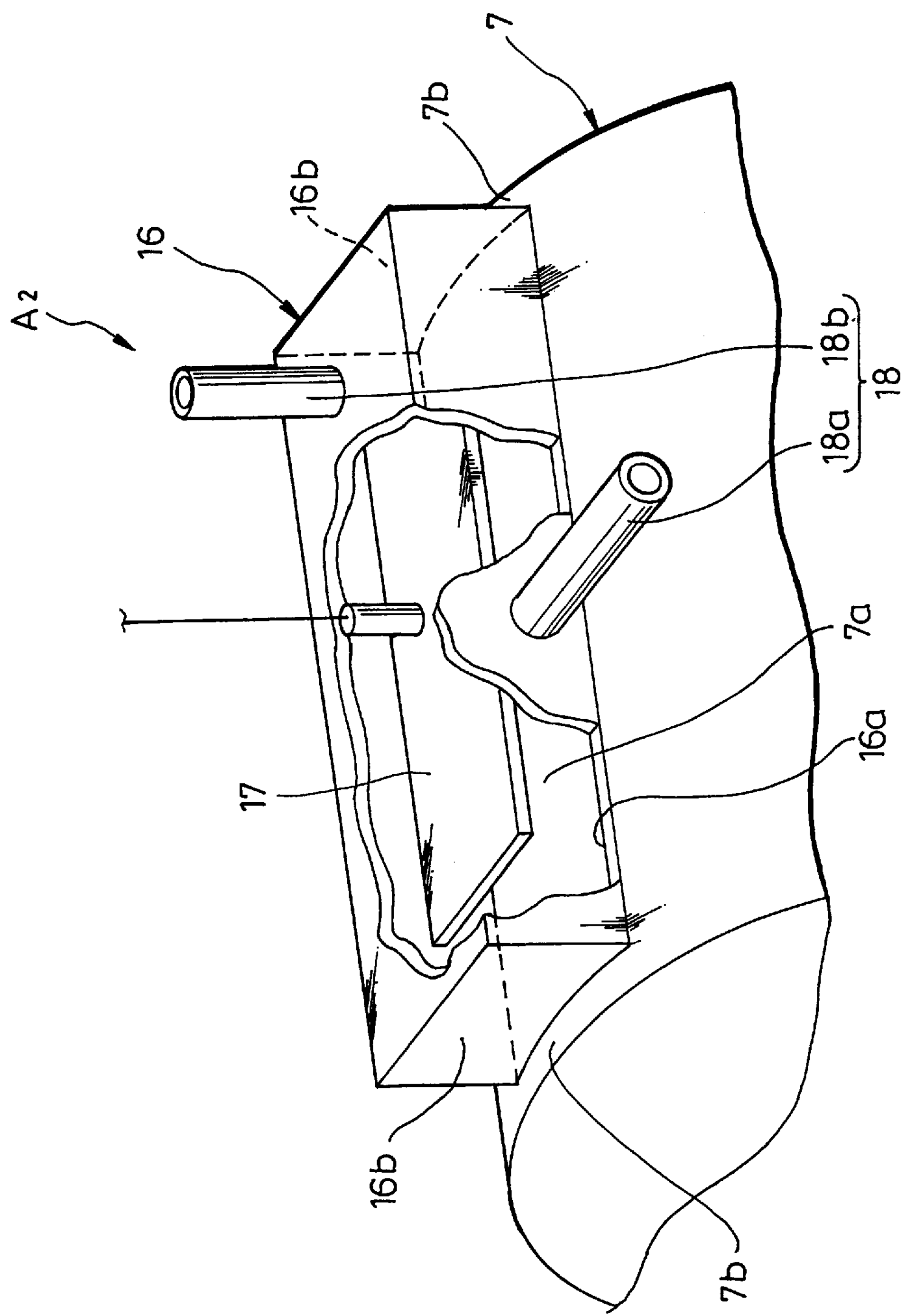
FIG. 6 is a partially cutaway perspective view showing a state in which an apparatus $A_2$ used for forming an oxide film is mounted on the exposed surface of a drum cathode body.
Figure 7:
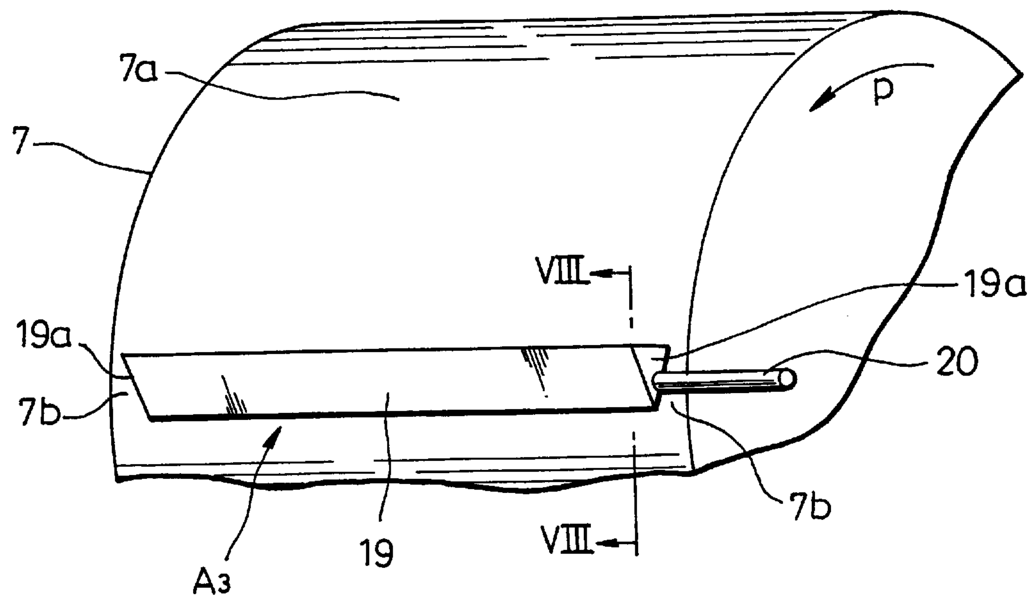
FIG. 7 is a partially cutaway perspective view showing a state in which an apparatus $A_3$ used for forming an oxide film is mounted on the exposed surface of a drum cathode body.
Figure 8:
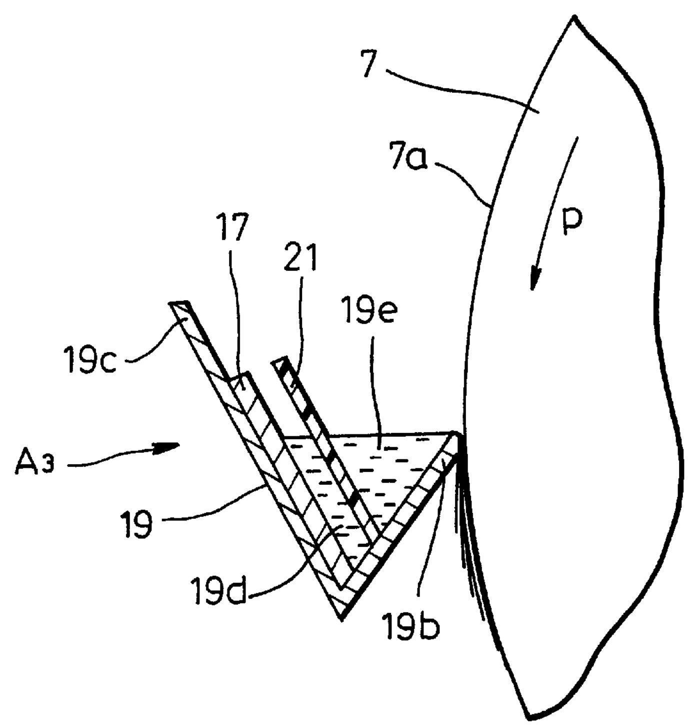
FIG. 8 is a sectional view taken along the line VIII—VIII of FIG. 7.

The apparatus $A_3$ shown in FIGS. 7 and 8 was mounted on the exposed surface of a titanium-made drum cathode body. An electrolytic copper foil was manufactured while a 35 nm thick titanium oxide film was formed on the exposed surface 7*a* of the drum cathode body 7 by applying a constant voltage of 25 V to between the counter electrode body 17 and the drum cathode body 7. The resultant electrolytic copper foil was subjected to surface roughening under the same conditions as in the case of the working example electrode 1.

The obtained electrolytic copper foil had a porous structure in which the average thickness was 25 μm, the Rz of S surface was 2 μm, the Rz of M surface was 9 μm, the diameter of open-pore was 0.1 to 3 μm, and the distribution density thereof was 150 to 250 pores/mm$^2$.

A collector with an average thickness of 50 μm whose surface consisted of the M surface was formed by lapping the electrolytic copper foil over another with their S surfaces being brought into contact with each other, and an active material mixture was put on the M surfaces in the same way as in the case of the working example electrode 1, by which a working example electrode 3 was manufactured.

This electrode was subjected to the same charging/discharging cycle test as in the case of the working example electrode 1.

This electrode showed a value of 98% or higher of the ratio of discharge capacity at the 20th cycle to discharge capacity at the 1st cycle, exhibiting excellent cycle life characteristics.

WORKING EXAMPLE 4

The apparatus $A_1$ shown in FIG. 5 was mounted on the exposed surface of a titanium-made drum cathode body. An electrolytic copper foil was manufactured while a 70 nm thick titanium oxide film was formed on the exposed surface 7*a* of the drum cathode body 7 by applying a constant voltage of 50 V to between the conductive roll 13 and the drum cathode body 7.

The obtained electrolytic copper foil had a porous structure in which the average thickness was 20 μm, the Rz of S surface was 2 μm, the Rz of M surface was 6 μm, the diameter of open-pore was 0.1 to 3 μm, and the distribution density thereof was 350 to 450 pores/$mm^2$.

After an active material mixture was put on the M surface and S surface of this electrolytic copper foil in such a manner that the ratio of amount of mixture supported on the M surface to that on the S surface is 9:1, the electrolytic copper foil was lapped over another with their S surface sides being brought into contact with each other in the same way as in the case of the working example electrode 3, and the lapped foils were dried and press-formed at a pressure of 2000 kg/$cm^2$, by which a working example electrode 4 was manufactured.

This electrode was subjected to the same charging/discharging cycle test as in the case of the working example electrode 1.

This electrode showed a value of 99% or higher of the ratio of discharge capacity at the 20th cycle to discharge capacity at the 1st cycle, exhibiting excellent cycle life characteristics.

WORKING EXAMPLE 5

Commercially available lithium carbonate ($Li_2CO_3$) and basic cobalt carbonate ($2CoCO_3.3Co(OH)_2$) were weighed so that the molar ratio of Li/CO is 1:1, and wet-blended using ethanol with a zirconia-made ball mill. Thereafter, the blended material was heat-treated at a temperature of 900° C. for two hours to synthesize $LiCoO_2$.

This $LiCoO_2$ was ground into powder with an average grain size of 16 μmwith the ball mill, and 6 parts by weight of graphite powder with an average grain size of 0.1 μm was blended with 100 parts by weight of this powder. Further, 3.5 parts by weight of polyvinylidene powder was dissolved in 30 parts by weight of N-methylpyrrolidone, and the resultant material was added to the aforesaid mixed powder of $LiCoO_2$ powder and graphite powder to prepare paste of active material mixture (electrode mixture).

Using this paste and using the electrolytic copper foil shown in the working example electrode 1 as a collector, a working example electrode 5 with the active material mixture of 20 mg was manufactured in the same way as in the case of the working example electrode 1.

This electrode was subjected to the same charging/discharging cycle test as in the case of the working example electrode 1.

This electrode showed a value of 98% or higher of the ratio of discharge capacity at the 20th cycle to discharge capacity at the 1st cycle, exhibiting excellent cycle life characteristics.

WORKING EXAMPLE 6

In working example 1, the electrolyte was replaced with an electrolyte for manufacturing electrolytic nickel foil, having a nickel sulfate concentration of 300 g/liter, a boric acid concentration of 40 g/liter, and a bath temperature of 60° C., and this electrolyte was used to form a 70 nm thick titanium oxide film on the exposed surface of drum cathode body by using the apparatus $A_4$. While forming this titanium oxide film, an electrolytic nickel foil was manufactured with a current density of 30 A/$dm^2$.

The obtained electrolytic nickel foil had a porous structure in which the average thickness was 25 μm, the Rz of S surface was 2 μm, the Rz of M surface was 7 μm, the diameter of open-pore was 0.1 to 4 μm, the distribution density thereof was 300 to 400 pores/$mm^2$, and the porosity was 5%.

Hydrogen occlusion alloy powder with a composition of $MmNi_{3.55}Mno_{0.4}Al_{0.3}Co_{0.75}$ (Mm: misch metal) and a grain size of 30 to 50 μm was prepared. Five parts by weight of 60% fluid dispersion of polytetrafluoroethylene powder and 30 parts by weight of 1.2% carboxymethylcellulose solution were mixed with 100 parts by weight of this alloy powder to prepare paste.

This paste was applied to both of the surfaces of the aforesaid two nickel foils, and one nickel foil was lapped over the other with their S surface sides being brought into contact with each other. After being dried, the lapped foils were press-formed at a pressure of 2000 kg/$cm^2$, by which a negative electrode for nickel-hydrogen battery with a thickness of 0.8 mm, a width of 70 mm, and a length of 100 mm was manufactured.

Meanwhile, a publicly known positive electrode with a thickness of 0.8 mm, a width of 70 mm, and a length of 100 mm was prepared. In this positive electrode, nickel hydroxide was used as an active material for the positive electrode, and the theoretical discharge capacity was set at a value about 0.7 times of the theoretical discharge capacity of aforesaid negative electrode. Separators of 0.2 mm thick made of nylon were interposed between four positive electrodes and five negative electrodes, and a 6NKOH electrolyte was used to assemble a nickel-hydrogen battery with a rated capacity of 10 Ah.

This battery was subjected to a charging/discharging cycle test, in which one cycle consists of 120% overcharging at 0.5 C and discharging down to a final discharge voltage of 1.0 V at 1.0 C, and the decrease ratio of discharge capacity at 500 cycle time was measured.

For comparison, negative electrodes were manufactured as a comparative example electrode 3 and comparative example electrode 4 by using a punching nickel sheet foil with an opening ratio of 10% and a nickel foam with a porosity of 50% as collectors, respectively, and by putting a mixture on the collector under the same conditions as described above, and nickel-hydrogen batteries were assembled. On these batteries as well, the decrease ratio of discharge capacity at 500 cycle time was measured in the same way as in the working example. The results are given in Table 2.

In addition, the tensile strength and elongation of the collector were measured by the method specified in JIS C6511, and the measured value is given in Table 2. Also, the manufacturing cost of the comparative example electrode, which is calculated when the manufacturing cost of the working example electrode 6 is taken as 1, is given as a relative value in Table 2.

TABLE 2

| | Decrease ratio of discharge | Mechanical properties of collector | | |
|---|---|---|---|---|
| | capacity (%: after 500 cycles) | Tensile strength (kg/$mm^2$) | Elongation (%) | Manufacturing cost (relative value) |
| Working example electrode 6 | 15 | 25 | 7 | 1 |

TABLE 2-continued

| | Decrease ratio of discharge capacity (%: after 500 cycles) | Mechanical properties of collector Tensile strength (kg/mm$^2$) | Elongation (%) | Manufacturing cost (relative value) |
|---|---|---|---|---|
| Comparative example electrode 3 | 20 | 15 | 5 | 3 |
| Comparative example electrode 4 | 24 | 5 | 1 | 10 |

As is apparent from the above result, a battery incorporating an electrode in which a metal foil of the present invention is used as a collector has a low decrease ratio of discharge capacity, and thereby has high cycle life characteristics. Also, the collector has high mechanical properties, so that, for example, breakage or like trouble is not caused even when the collector is contained in the battery by being wound. Because the collector is manufactured by electrolytic plating, it can be mass-produced, so that the manufacturing cost can be reduced, which contributes to the provision of inexpensive electrodes.

WORKING EXAMPLES 7 AND 8

When the electrolytic copper foil of working example 1 was manufactured, the resin liquid described below was sprayed onto the exposed surface 7*a* of the drum cathode body 7 under the following conditions.

Composition of resin liquid: RIPOXY R-804B (trade name, a resin manufactured by Showa Highpolymer Co., Ltd.) 96.5 wt %, PERMERIC (trade name, a hardening agent manufactured by Showa Highpolymer Co., Ltd.) 3 wt %, Hardening Accelerator D (trade name, manufactured by Showa Highpolymer Co., Ltd.) 0.5 wt %

Spraying: Pressure Sprayer No. 7760 (trade name, a pressure-type sprayer manufactured by Furupla Co., Ltd.)

After the resin liquid was hardened, electrolytic plating was performed under the same conditions as those in working example 1 to form a copper thin layer on the hardened film. By separating the copper thin layer, an electrolytic copper foil was manufactured.

For the obtained electrolytic copper foil, the average thickness was 10 $\mu$m, the Rz of S surface was 1.5 $\mu$m, and the Rz of M surface was 2.5 $\mu$m. In the thickness direction, open-pores with a diameter of 0.1 to 80 $\mu$m were found with a distribution density of 1 to 5 pores/mm$^2$ on the surface.

Without surface roughening, 20 mg of the electrode mixture of working example 1 was put on both of the surfaces of this electrolytic copper foil to manufacture a working example electrode 7.

Also, in working example 1, an electrolytic copper foil was manufactured by performing electrolytic plating under the same conditions as those in working example 1 except that FBK-RO220 (trade name, a machine oil manufactured by Mitsubishi Oil Co., Ltd.) was suspended with a concentration of 100 g/m$^3$ in electrolyte.

For the obtained electrolytic copper foil, the average thickness was 10 $\mu$m, the Rz of S surface was 1.5 $\mu$m, and the Rz of M surface was 2.3 $\mu$m. In the thickness direction, open-pores with a diameter of 0.1 to 60 $\mu$m were found with a distribution density of 1 to 10 pores/mm$^2$ on the surface.

Without surface roughening, 20 mg of the electrode mixture of working example 1 was put on both of the surfaces of this electrolytic copper foil to manufacture a working example electrode 8.

For comparison, without surface treatment on the exposed surface of the drum cathode body, a copper thin layer was formed directly on the exposed surface under the conditions for electrolytic plating in working example 1, and then separated to manufacture an electrolytic copper foil.

For the obtained electrolytic copper foil, the average thickness was 10 $\mu$m, the Rz of S surface was 1.5 $\mu$m, and the Rz of M surface was 2.5 $\mu$m. In the thickness direction, no pores were found.

Without surface roughening, 20 mg of the electrode mixture of working example 1 was put on both of the surfaces of this electrolytic copper foil to manufacture a comparative example electrode 5.

By using these electrodes, the same three-electrode cells as in working example 1 were assembled, and a charging/discharging cycle test was made under the same conditions. The result is given in Table 3.

TABLE 3

| | Ratio of discharge capacity in charging/discharging cycle test (%: 20th cycle/1st cycle) |
|---|---|
| Working example electrode 7 | About 80 |
| Working example electrode 8 | About 85 |
| Comparative example electrode 5 | About 60 |

As is apparent from the above result, since the working example electrodes 7, 8 have a collector (electrolytic copper foil) of a porous structure, the discharge capacity is unlikely to decrease in the process of charging/discharging cycle, so that these electrodes have high cycle life characteristics.

INDUSTRIAL APPLICABILITY

The metal foil manufactured by the method in accordance with the present invention has many open-pores formed in the thickness direction.

Therefore, when this metal foil is used as a collector for a secondary battery, the openings of these open-pores have an anchoring effect on the electrode mixture supported on the metal foil, so that the contact strength between the electrode mixture and the collector is increased, by which the electrode mixture is prevented from peeling off in the charging/discharging cycle.

Also, when this metal foil is used as a collector for the electrode of lithium battery, the electron transfer reaction in battery operation proceeds smoothly via the open-pores of this metal foil, so that the coefficient of use of active material is increased, by which the cycle life characteristics of battery is improved.

Since this metal foil is manufactured by electrolytic plating, it can be mass-produced, so that the manufacturing cost is decreased, which contributes greatly to the manufacture of inexpensive electrodes.

What is claimed is:

1. A method of manufacturing a porous electrolytic metal foil, comprising:

immersing an anode body and a cathode body in an electrolyte containing metal ions and applying electric current to between the anode body and the cathode body while continuously moving the cathode body through the electrolyte to continuously form a thin metal layer by electrically depositing the metal ions on a surface of the cathode body;

continuously separating said thin metal layer from the surface of said cathode body, while said cathode body is moving so as to form an exposed surface on said cathode body; and contacting the exposed surface of said cathode body with an organic, electrically insulating substance to carry out a surface treatment to adhere said organic substance to said exposed surface so as to partially cover said exposed surface with a film.

2. The method of manufacturing a porous electrolytic metal foil according to claim 1, wherein said surface treatment is carried out to make said organic substance adhere to said exposed surface by spraying said organic substance onto said exposed surface.

3. The method of manufacturing a porous electrolytic metal foil according to claim 1, wherein said surface treatment is carried out to make said organic substance adhere to said exposed surface by suspending said organic substance in said electrolyte.

4. The method of manufacturing a porous electrolytic metal foil according to claim 1, wherein said electrolytic metal foil has a structure comprising open-pores with a diameter of 0.1 to 80 $\mu$m which are formed in the thickness direction and said open-pores have a distribution density of 1 to 500 pores/mm$^2$ on the surface thereof.

5. The method of manufacturing a porous electrolytic metal foil according to claim 4, wherein the organic substance is a resin liquid.

6. The method of manufacturing a porous electrolytic metal foil according to claim 5, wherein the resin is selected from the group consisting of a polyester, an epoxy resin, a polyamide and a polyurethane.

7. The method of manufacturing a porous electrolytic metal foil according to claim 3, wherein the organic substance is a machine oil or an insulating oil.

8. The method of manufacturing a porous electrolytic metal foil according to claim 1, wherein the anode body comprises lead.

9. The method of manufacturing a porous electrolytic metal foil according to claim 8, wherein said surface of the cathode body comprises stainless steel, Ti, Cr, Al or a Cr—Al alloy.

10. The method of manufacturing a porous electrolytic metal foil according to claim 9, wherein the electrolyte comprises a solution selected from the group consisting of a copper sulfate solution, a nickel sulfate solution, a nickel sulfamate solution, an $AlCl_3$—$LiAlH_4$-tetrahydrofuran bath and a $NaF.2Al(C_2H_5O_3).4$ toluene bath.

11. The method of manufacturing a porous electrolytic metal foil according to claim 1, wherein the electrolyte comprises copper.

12. The method of manufacturing a porous electrolytic metal foil according to claim 6, wherein the anode body comprises lead; said surface of the cathode body comprises stainless steel, Ti, Cr, Al or a Cr—Al alloy and the electrolye comprises a solution selected from the group consisting of a copper sulfate solution, a nickel sulfate solution, a nickel sulfamate solution, an $AlCl_3$—$LiAlH_4$-tetrahydrofuran bath and a $NaF.2Al(C_2H_5O_3).4$ toluene bath.

13. The method of manufacturing a porous electrolytic metal foil according to claim 7, wherein the anode body comprises lead; said surface of the cathode body comprises stainless steel, Ti, Cr, Al or a Cr—Al alloy and the electrolye comprises a solution selected from the group consisting of a copper sulfate solution, a nickel sulfate solution, a nickel sulfamate solution, an $AlCl_3$—$LiAlH_4$-tetrahydrofuran bath and a $NaF.2Al(C_2H_5O_3).4$ toluene bath.

* * * * *